(12) United States Patent
Conlon et al.

US010250768B2

(10) Patent No.: US 10,250,768 B2
(45) Date of Patent: Apr. 2, 2019

(54) PRINT MEDIA SIZE/COLOR DETECTION USING SCANNER

(71) Applicant: Xerox Corporation, Norwalk, CT (US)

(72) Inventors: Paul Roberts Conlon, South Bristol, NY (US); Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 102 days.

(21) Appl. No.: 15/249,802

(22) Filed: Aug. 29, 2016

(65) Prior Publication Data

US 2018/0063347 A1 Mar. 1, 2018

(51) Int. Cl.
*H04N 1/00* (2006.01)
*H04N 1/60* (2006.01)

(52) U.S. Cl.
CPC ..... *H04N 1/00724* (2013.01); *H04N 1/00424* (2013.01); *H04N 1/00599* (2013.01); *H04N 1/00612* (2013.01); *H04N 1/00708* (2013.01); *H04N 1/00718* (2013.01); *H04N 1/00737* (2013.01); *H04N 1/00766* (2013.01); *H04N 1/6097* (2013.01); *H04N 2201/0094* (2013.01)

(58) Field of Classification Search
None
See application file for complete search history.

(56) References Cited

U.S. PATENT DOCUMENTS

| 5,483,889 | A | 1/1996 | Hoberock et al. |
| 6,075,623 | A | 6/2000 | Yun |
| 6,769,681 | B2 | 8/2004 | Nakamura et al. |
| 7,420,713 | B2 * | 9/2008 | Ohmori ............. H04N 1/32203 358/1.9 |
| 7,731,181 | B2 | 6/2010 | Chang |
| 7,887,048 | B2 | 2/2011 | Ohno et al. |
| 8,289,585 | B2 | 10/2012 | Shinkawa |
| 8,387,972 | B1 | 3/2013 | Ledgerwood et al. |
| 8,830,490 | B2 * | 9/2014 | Pouyadou .......... G03G 15/5029 358/1.12 |
| 8,908,236 | B1 * | 12/2014 | Rudge ................ H04N 1/00708 358/449 |
| 8,976,412 | B2 * | 3/2015 | Mitsubori ............. G06F 3/1204 358/1.13 |
| 9,426,310 | B2 * | 8/2016 | Onuki ................ H04N 1/00737 |
| 2010/0157357 | A1 * | 6/2010 | Torikoshi ............. G06F 3/1203 358/1.15 |

(Continued)

*Primary Examiner* — Paul F Payer
(74) *Attorney, Agent, or Firm* — Gibb & Riley, LLC

(57) ABSTRACT

A user interface of a printer displays instructions to use the printer's document scanner for scanning a sheet of print media (of a stack of print media being added to the paper drawer) in response to a drawer sensor detecting the opening of the paper drawer. The document scanner generates an electronic image of the sheet of print media from the scanning of the sheet of print media. The processor evaluates the electronic image of the sheet of print media to identify the media type and color of the stack of print media being added to the paper drawer. For example, this is done by evaluating the size, color characteristic, transparency, and reflection characteristic of the electronic image of the sheet of print media. Then, the electronic memory records that the paper drawer contains the stack of print media having a specific media type and color.

18 Claims, 9 Drawing Sheets

(56) References Cited

U.S. PATENT DOCUMENTS

| | | | | |
|---|---|---|---|---|
| 2015/0022830 A1* | 1/2015 | Kwak | ................. | G06K 15/021 |
| | | | | 358/1.6 |
| 2015/0062635 A1* | 3/2015 | Anno | ................. | G06K 15/4065 |
| | | | | 358/1.15 |
| 2015/0281492 A1* | 10/2015 | Mamura | ............ | H04N 1/00779 |
| | | | | 358/1.15 |
| 2015/0326744 A1 | 11/2015 | Onuki et al. | | |
| 2015/0347065 A1* | 12/2015 | Tsujita | ................. | G03G 15/502 |
| | | | | 358/1.15 |

* cited by examiner

PRINT MEDIA SIZE/COLOR DETECTION USING SCANNER

BACKGROUND

Systems and methods herein generally relate to printing devices, and more particularly to devices and systems that determine the size and/or color of print media within the paper tray.

Printers have various types of media sensors in the paper trays. These sensors and their locations are highly tuned to detect standard media sizes; however, such sensors are generally not superior for non-standard sheet size detection, and will often prompt the user for clarification on media attributes (size, type, color). Sheet size sensors are in subsystems that currently are well-connected, and redundant. Also, codes on paper packages indicating standard paper sizes and colors are commonly scanned to help setup a paper feeder tray.

In one example, users commonly open a paper feeder tray, add paper, and close the tray. Tray sensors then attempt to determine sheet size, and the user is prompted to confirm. One can also manually define a custom size, or pick a color (including custom). For office environments the defaults are typically sufficient once the paper size is detected (plain white paper, 8.5×11 or A4, for example). For other environments such as small print shops or schools, paper color and custom sizes can play a greater role. Paper size sensing for non-standard media is problematic, but even for standard sizes there can be problems due to the guides not being adjusted properly and the somewhat crude granularity of the sensors.

SUMMARY

An exemplary printer includes (among other components) a print media storage device (e.g., paper tray or drawer), a drawer sensor positioned to detect a user opening the print media storage device, a processor electrically connected to the drawer sensor, an electronic memory electrically connected to the processor, a document scanner electrically connected to the processor, and a user interface electrically connected to the processor.

Further, such devices can include tray sensors electrically connected to the processor. The processor can also determine whether the tray sensors detect the media type of the stack of print media. The user interface displays instructions to use the document scanner for scanning a sheet of print media (of a stack of print media being added to the print media storage device) in response to the drawer sensor detecting the opening of the print media storage device, and such instructions may only be displayed on the user interface if the tray sensors cannot detect the media type of the stack of media.

Following the on-screen instructions, the user scans the sheet using the document scanner to generate an electronic image of the sheet of print media. The processor evaluates the electronic image of the sheet of print media to identify the media type and color of the stack of print media being added to the print media storage device. For example, this is done by evaluating the size, color characteristic, transparency, and reflection characteristic of the electronic image of the sheet of print media. Then, the electronic memory records that the print media storage device contains a stack of print media having a specific media type, size, color, etc.

The instructions provided on the user interface can direct that the sheet of print media be oriented the same as the stack of print media is oriented in the print media storage device, and the processor evaluates the electronic image to identify an orientation of the stack of print media in the print media storage device. The user interface can also display additional instructions to use the document scanner to scan multiple tabbed sheets of print media, and the processor evaluates such electronic images to identify different locations of tabs within the stack of print media.

In addition, the processor can evaluate the electronic image to identify locations and orientations of holes in the sheet of print media and/or pre-printed marks on the sheet of print media. Such pre-printed marks include letterheads, logos, watermarks, etc. The electronic memory records the locations and orientations of the holes and/or pre-printed marks of the stack of print media in the print media storage device.

Devices herein can also include a bypass path. The bypass path comprises sheet feeders that automatically move the sheet of print media from the print media storage device to the document scanner, and the user interface displays additional instructions to activate the bypass path to automatically use the document scanner for the scanning.

Also, when the processor prepares a print job for printing with the printer, the processor incorporates the color of the sheet of print media within calculations of colors to utilize during the printing.

Presented in method form, various methods herein detect the opening of a print media storage device by a drawer sensor of a printer, which indicates that print media is being added to the print media storage device. Initially, these methods determine whether the media type of the stack of print media is detected by tray sensors of the printer (that detect standard sheet sizes).

However, if the tray sensors do not detect standard sheet sizes, these methods display, on the user interface of the printer, instructions to use the document scanner of the printer for scanning the type and color of a sheet of print media (of a stack of print media being added to the print media storage device) in response to the drawer sensor detecting the opening of the print media storage device (in some cases using duplex scanning to determine if the front and back of the sheet are the same or different). The instructions can also direct that the sheet of print media being scanned should be oriented the same as the stack of print media is oriented in the print media storage device. If tabbed sheets are being added, these methods can also display additional instructions to use the document scanner to scan multiple tabbed sheets of print media (and such sheets are counted by methods herein). Thus, these methods generate (using the document scanner) an electronic image of the sheet(s) of print media, from the scanning of the sheet of print media.

Such methods then evaluate (using the processor of the printer) the electronic image of the sheet of print media to identify the media type and color (and orientation) of the stack of print media being added to the print media storage device. When evaluating the electronic image, these methods identify locations and orientations of holes in the sheet of print media, pre-printed marks on the sheet of print media, as well as locations of tabs within the stack of print media. These pre-printed marks include letterheads, logos, watermarks, etc.

Additionally, these methods record, in the electronic memory of the printer, that the print media storage device contains the stack of print media having the media type and color, as well as the locations and orientations of the holes and pre-printed marks of the stack of print media in the print media storage device.

Subsequently, these methods prepare a print job for printing with the printer by incorporating the color of the sheet of print media within calculations of colors to utilize during the printing, using the processor.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, paper size sensing for non-standard media is problematic, especially if paper guides are not properly adjusted. Therefore, the systems and methods herein allow the user to scan a sheet of media that will be placed into the paper tray to determine various characteristics of the media, including size and color. The scanners provide pixel level accuracy, and a more robust, tolerant approach; and give much better results for size detection, relative to zone sensors that merely determine if a sheet is detected in a zone. Additionally, image deskew processes (e.g., edge detection of sheet rotated/displaced on platen) are used to improve media size detection.

Further, using scanners allows precise (even non-standard) paper color to be detected, and made visible to user. Otherwise, the pre-set paper color choices are very limited, and are statically defined in the user interface. This feature allows for a great range of colors, displayed in the sheet icon on the user interface. Additionally, the orientation of the sheet in the scanned image is detected and displayed, which eliminates the user having to specify orientation, etc.

The analysis of the scanned image allows the printing devices herein to detect additional attributes, such as a company letterhead, hole punched paper, etc. Further, the paper tray setting information, including non-standard/custom paper color, is exported to upstream to the page description language (PDL) interpreter submission clients as capabilities.

Existing tray sensors are either removed (for low-end machines to save build expense) or are used in conjunction with the scan imaging. Thus, in one structure herein tray sensors first attempt to determine the size of the media sheet, but if the tray sensors are unable to detect the media size, the user is provided the option to scan a sheet of media.

In other structures herein, the tray feeds a media sheet to the scanner automatically through a special setup path. This allows devices herein to perform scanned size and color detection fully automatically, without instructing the user to scan a media sheet. The setup path either ejects the sheet to an output tray, or returns the sheet back into the input tray.

Such structures minimize entry errors while making it easier to determine sizes, especially non-standard sizes and non-standard colors. Paper icons in the user interface are given accurate sheet dimensions, which allows for a finer-grained display of actual media size. Further, rather than a stock icon, the user interface shows the shape (e.g., relative dimensions of the media show the correct media aspect ratio), color, and orientation of the loaded paper.

Figure 1:
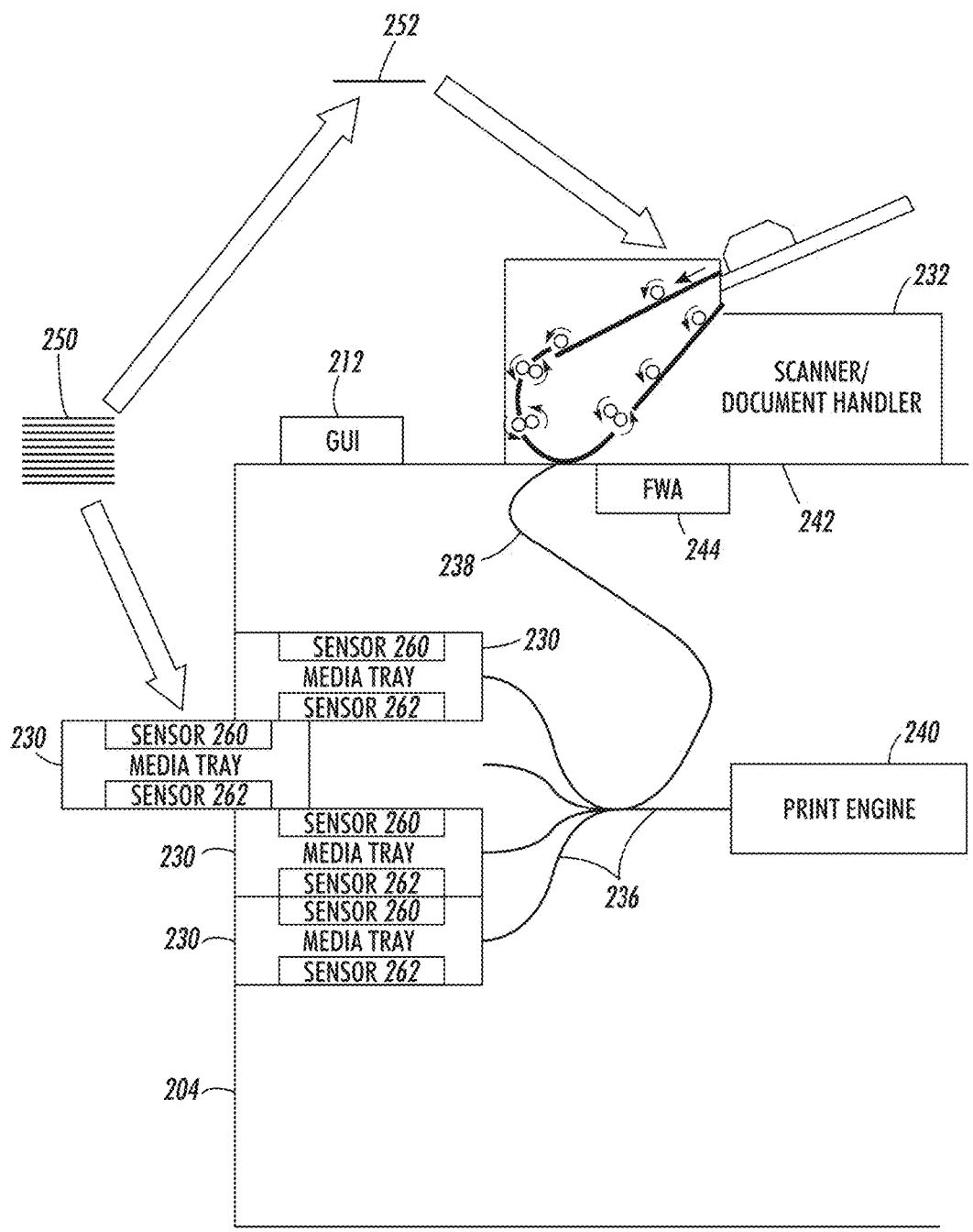
FIGS. 1 and 2 are schematic diagrams illustrating portions of a printing device herein.
Figure 2:
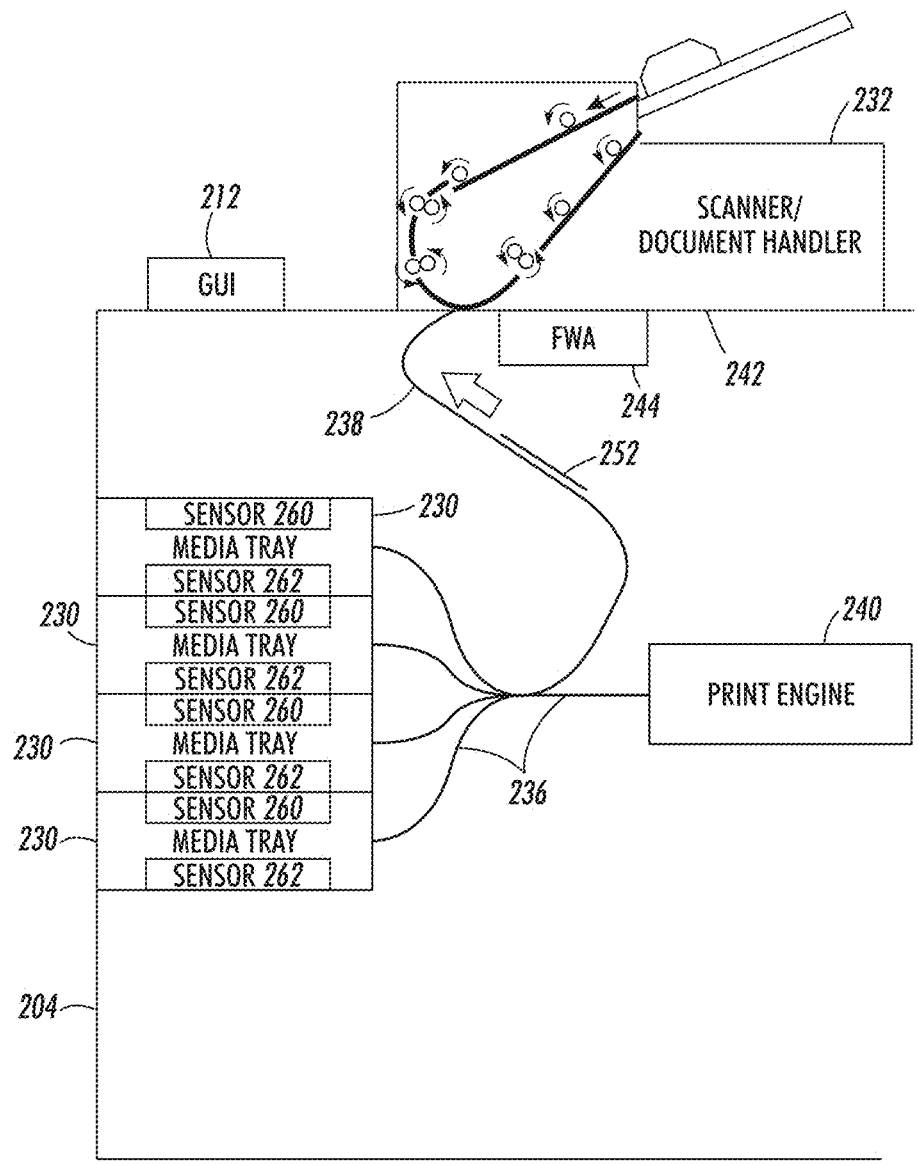

FIGS. 1 and 2 are schematic diagrams that illustrate a portion of a printing device 204 (which is illustrated in greater detail in FIG. 10, discussed below). This exemplary printer 204 includes (among other components) a print media storage device 230 (e.g., sometimes referred to herein as a paper tray or drawer), a drawer sensor 260 positioned to detect opening of the paper tray 230, a processor 224 (FIG. 10) electrically connected to the drawer sensor 260, an electronic memory 210 (FIG. 10) electrically connected to the processor 224, a document scanner 232 electrically connected to the processor 224, a user interface 212 electrically connected to the processor 224, a media path 236, and a bypass path 238. Further, such devices can include tray sensors 262 (electrically connected to the processor 224) that indicate whether sheets 250 in the tray 230 extend to fixed points in the tray 230.

While a generic paper tray 230 is shown in FIGS. 1 and 2, those ordinarily skilled in the art would understand that printer paper trays generally include document feeding elements, document lifting elements, paper guides, etc., any of which can be connected to sensors, electric actuators, etc. The drawer sensor 260 can be any form of electrical switch (optical, contact, etc.) that detects which paper tray 230 is open, and the tray sensors 262 can similarly be contact sensors, optical sensors, etc. (generally in fixed positions) that very simplistically detect whether sheets of media extend to a specific location within the paper tray 230.

In some implementations, when the drawer sensor 260 detects the user opening the paper tray 230, the user interface 212 immediately displays instructions for the user to use the document scanner 232 to scan a sheet 252 of print media from the stack of print media 250 being added to the paper tray 230. Thus, the second paper tray 230 in FIG. 1 is shown as being open, a stack of print media 250 is shown by arrow as being loaded into the paper tray 230, and a sheet 252 from the stack 250 is shown by arrow as being scanned using the scanner 232. Also, FIG. 6 (discussed in greater detail below) illustrates the user interface 212 displaying instructions for the user to use the document scanner 232 to scan a sheet 252 of print media from the stack of print media 250 being added to the paper tray 230.

As shown in FIG. 2, instead of instructing the user to manually place one of the sheets 252 in the scanner device 232, printing devices herein can optionally automatically feed a sheet 252 from the media trays 230 to the scanner device 232 using the bypass path 238, which includes nip rollers, sheet guides, gates, etc., that selectively drive and direct sheets of media. Therefore, the bypass path 238 uses sheet feeders that automatically move the sheet 252 of print media from each paper tray 230 to the document scanner 232 (and back) to automatically use the document scanner 232 for the scanning.

In other implementations, detection of the opening of the paper tray 230 by the drawer sensor 260 of the printer may only indicate that new or different print media might have been added to the paper tray 230. Therefore, before displaying any messages, these devices 204 can optionally initially attempt to determine whether the size of the media (in the paper tray 230 that was opened) has changed by finding the size of the print media 250 added to the paper tray 230 using the tray sensors 262. Specifically, if the tray sensors 262 detect that the media 250 added to the paper tray 230 is the same size as the print media that was previously in the paper tray 230 (by comparing the currently detected media size with a previously recorded media size for a given paper tray 230), these devices can optionally not provide any messages to the user through the user interface 212 (however, this may only occur for standard sized sheets, because the tray sensors 262 may only detect standard sheet sizes). Note that the tray sensors 262 may not be able to determine the size of custom sized print media within the paper tray 230, because the tray sensors 262 may not be able to detect edges or sides of custom sized print media, or at least may not be able to detect a sufficient number of edges or sides of custom sized print media. If no (or an insufficient number of) edges are detected, the processor 224 determines that the tray sensors 262 cannot accurately detect the sheet size or shape.

Figure 6:
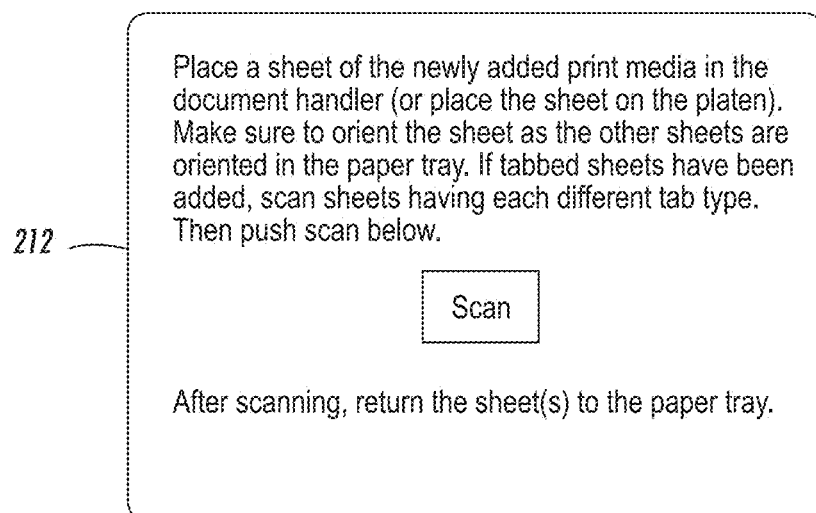

Therefore, if the tray sensors 262 detect that the media added to the paper tray 230 is the same size as the print media that was previously in the paper tray 230, the messages shown in FIG. 6 can be omitted. However, in other implementations, these devices 204 can optionally always provide some initial messages and inquiries to the user any time a paper tray 230 is detected as being opened, irrespective of whether the tray sensors 262 detect that the size of the print media 250 has, or has not, changed.

Figure 3:
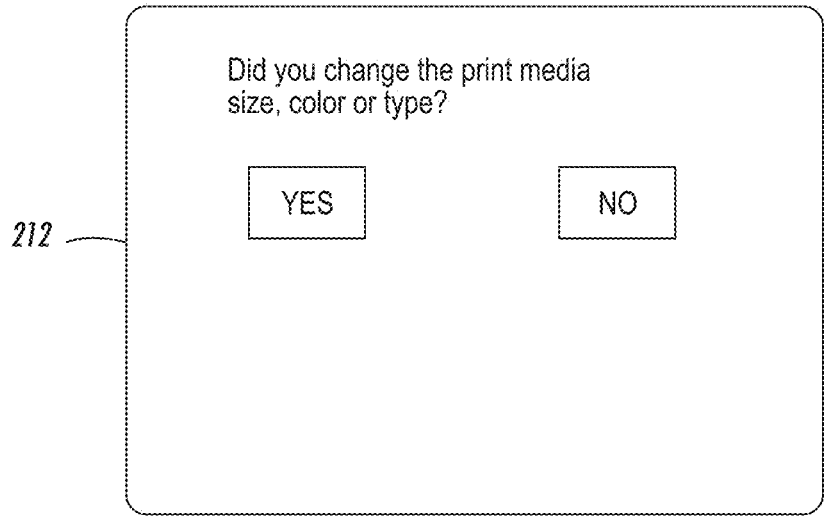
FIGS. 3-7C are schematic diagrams illustrating user interface screens provided herein.
Figure 4:
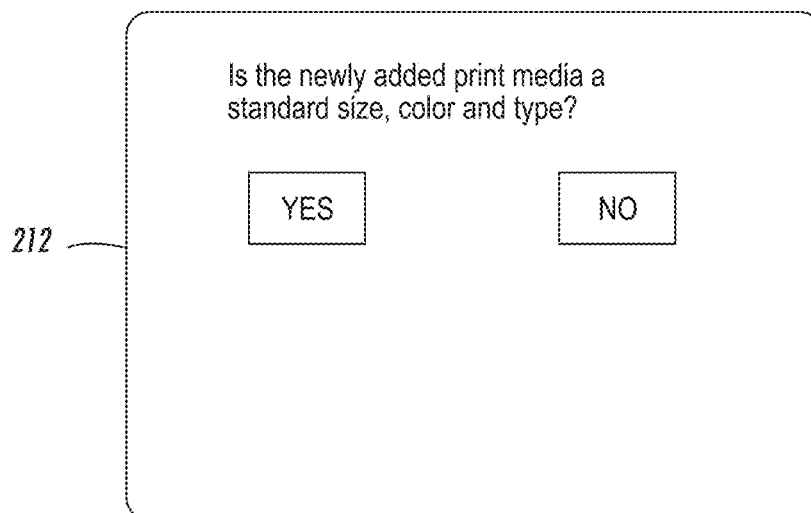
Figure 5:
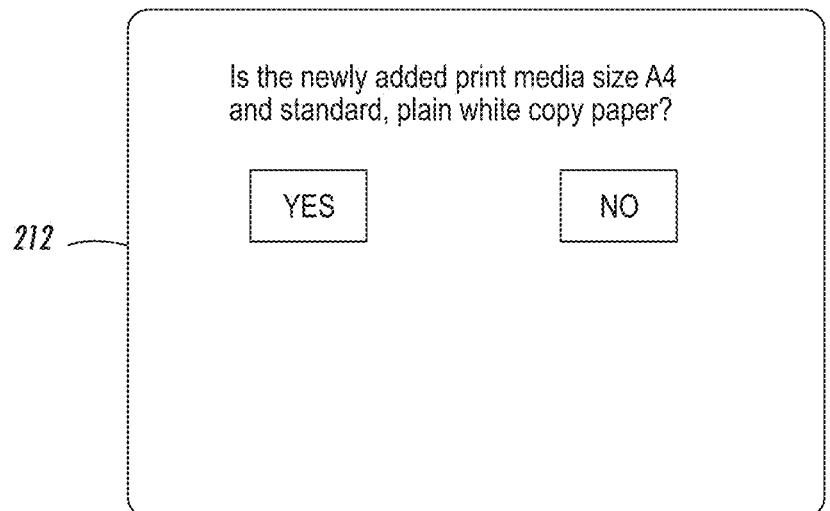

With regard to the type of messages and inquiries that can be provided on the user interface 212, some examples are shown in FIGS. 3 and 4, where the user is asked whether a different size, color, or type of print media has been added to the paper tray 230 (FIG. 3) and whether the newly added print media is a standard size, color, and type (FIG. 4). Another exemplary message/inquiry that can be provided on the user interface 212 is shown in FIG. 5, where the user interface can ask the user to confirm the print media size, shape, and color that the tray sensors 262 detected (and a presumed standard color). In the example shown in FIG. 5, the sensors detected A4 size print media, and this example presumes a standard white copy paper color for such print media.

If the user indicates that a different size, color, or type print media has been added (e.g., FIG. 3), if the tray sensors 262 detect that a different size media has been added, or if the tray sensors 262 cannot determine the size print media size, the user interface 212 can display instructions (e.g., FIG. 6) for the user to use the document scanner 232 to scan a sheet 252 of print media from the stack of print media 250 being added to the paper tray 230. However, again in some implementations, every time a paper tray 230 is detected as being opened, instructions to scan a sheet 252 of newly added print media may be displayed on the user interface 212.

For example, in FIG. 6, instructions are provided on the user interface 212 to place a sheet 252 of the newly added print media 250 in the document handler 232 (or place the print media 252 on the platen 242 and start a scan). The user can be instructed to make sure to orient the media 252 as it is oriented in the paper tray 230. If tabbed sheets have been added, the user can be instructed to scan sheets of each different tab type. The user can also be told to return the sheet 252 to the paper tray 230 after scanning.

As is generally understood by those ordinarily skilled in the art, the scanner/document handler 232 is a device that automatically feeds sheets past a high-resolution optical scanner (e.g., full width array (FWA) scan bar 244). The scanner/document handler structure 232 is positioned over a transparent platen 242 through which the optical scanner 244 scans items placed on the platen 242 (or fed by the document handler), and the document handler portion of the device 232 can be rotated upward from the platen 242, to allow items to be placed directly on the platen 242.

The document scanner 232 generates an electronic image of the sheet 252 of print media from the scanning process. The processor 224 evaluates the electronic image of the sheet 252 of print media to identify the media type, size, color, tabs, holes, orientation, marks, etc., and associates the same information with the stack of print media 250 being added to the paper tray 230. For example, this is done by evaluating the size, color characteristic, transparency, reflection characteristic, etc., of the electronic image of the sheet 252 of print media. Further such evaluation includes image deskew processes, edge detection of a sheet rotated or displaced on platen, etc., to accurately determine the size and shape of the media. Then, the electronic memory 210 records that the paper tray 230 contains the stack of print media 250 having the media type and color.

Thus, the instructions can direct that the sheet 252 of print media be oriented the same as the stack of print media 250 is oriented in the paper tray 230, and the processor 224 evaluates the electronic image to identify an orientation of the stack of print media 250 in the paper tray 230. The user interface 212 can also display additional instructions to use the document scanner 232 to scan multiple tabbed sheets 252 of print media, and the processor 224 evaluates the electronic image to identify locations of tabs within the stack of print media 250.

In addition, the processor 224 can evaluate the electronic image to identify locations and orientations of holes in the sheet 252 of print media and/or pre-printed marks on the sheet 252 of print media. Such pre-printed marks include letterheads, logos, watermarks, etc. (e.g., see the logo in the icon representing tray #1 in FIG. 7B, and the hole punches in the icon representing tray #2 in FIG. 7B). The electronic memory 210 records the locations and orientations of the holes and/or pre-printed marks of the stack of print media 250 in the paper tray 230.

Figure 7A:
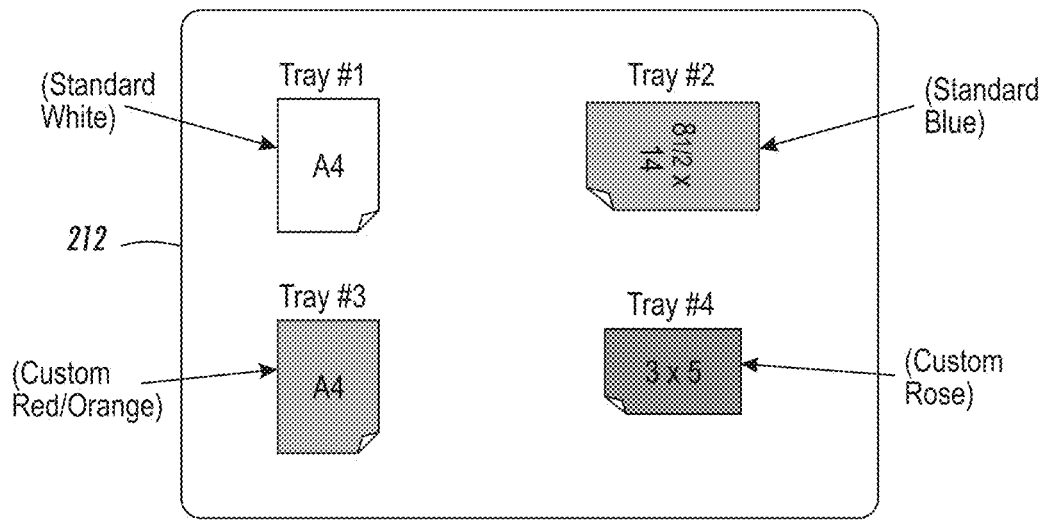
Figure 7B:
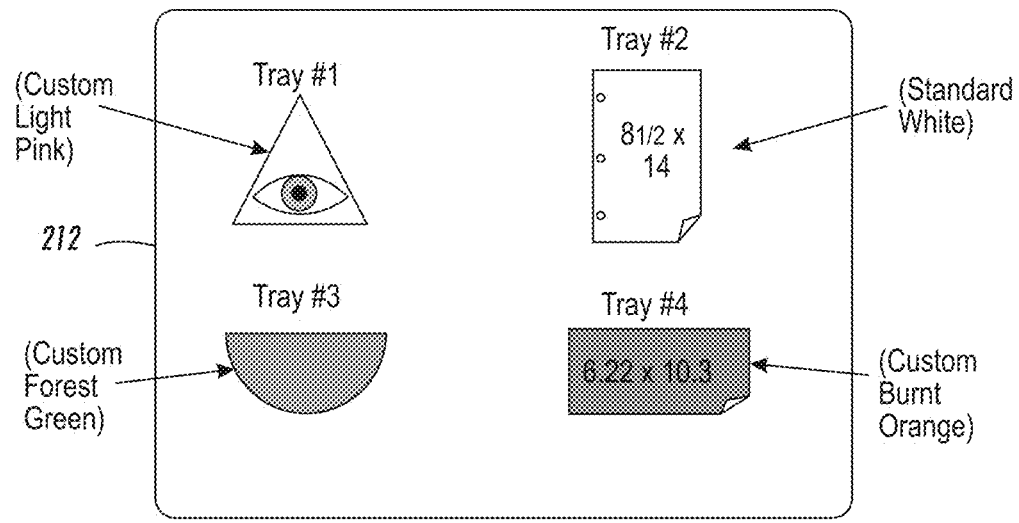
Figure 7C:
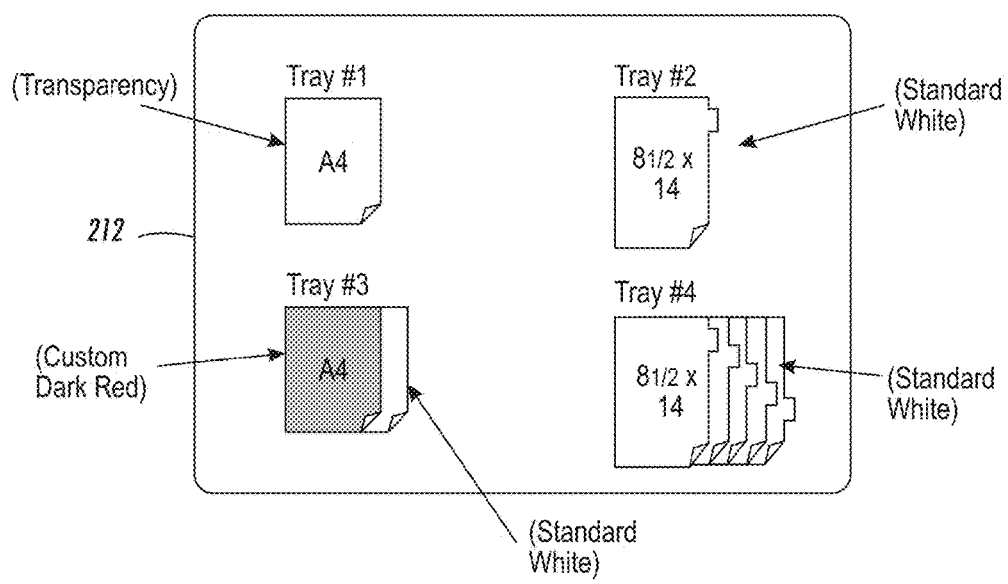

These devices 204 display color and size specific icons on the user interface 212, as shown in FIGS. 7A-7C. Note that the attached drawings are black-and-white; however the colors that are seen by the user observing the user interface 212 are indicated using color descriptions in brackets, and arrows in FIGS. 7A-7C. Such color descriptions, brackets, and arrows would not appear on the user interface 212, and are only used in the drawings to help the reader understand that the black and white drawings actually illustrate color icons. The letters and numbers within the icons shown in FIGS. 7A-7C are, however, visible on the graphic user interface 212. Also, when displaying color specific and size specific icons, as shown in FIGS. 7A-7C, the graphic icons presented on the user interface 212 have different colors, sizes, shapes, etc., that correspond to the different colors, sizes, shapes, etc., of the print media within the different trays, and the icons are oriented as they are oriented in the different trays.

Thus, for example, in FIG. 7A, tray #1 includes white A4 paper, tray #2 includes standard blue 8½×14 paper oriented perpendicular to the direction of the sheets in tray #1, etc. However, tray #3 in FIG. 7A includes a custom color A4 size paper that is a mixture of red and orange. Rather than simply displaying a standard color red or standard color orange icon, the methods herein display the actual color of the print media that is within tray #3 based on the electronic image produced in item 110 (as closely as the user interface 212 can display such a color). In additional examples of how the methods and devices herein uniquely display the print media icons on the user interface 212, FIG. 7A uses an icon that illustrates that tray #4 is loaded with 3×5 cards that have a custom rose color (where the icon matches the color and orientation detected in the electronic image produced in item 110).

Additionally, FIG. 7A displays the icons using different relative sizes corresponding to the different sizes of the different print media. Thus, the icons in FIG. 7A show print media that is relatively smaller using relatively smaller icons and print media that is relatively larger using relatively larger icons, where the 3×5 cards in tray #4 utilizes a smaller icon than trays #1 and #3 that contains A4 media, which in turn use smaller icons than the largest sheet size print media (8½×14) that is in tray #2.

The icons shown on the user interface 212 in FIG. 7B illustrate additional examples. More specifically, the media within tray #1 is represented using an icon showing triangular print media having a logo (that matches the actual shape and orientation detected in the electronic image produced in item 110) that is the custom color of light pink; tray #2 is represented using an icon showing 8½×14 standard white print media; tray #3 is represented using an icon showing print media that has a half circle shape (that matches the actual shape and orientation detected in the electronic image produced in item 110) and a custom color of forest green; and tray #4 is represented using an icon showing a custom size rectangular media 6.22×10.3 than has a custom burnt orange color. Note that the shapes of the icons for trays #1, #3, and #4 match the actual shape and orientation detected in the electronic image produced in item 110, even though the icons are smaller than the sheets themselves (are reduced size icons or thumbnails of the actual electronic images produced in item 110), and such shapes are not generic triangles, circles, etc. As additional examples, an "eye" logo detected in the electronic image produced in item 110 is presented in the icon representing tray #1 in FIG. 7B, and three hole punches detected in the electronic image produced in item 110 are included in the icon representing tray #2 in FIG. 7B.

The icons shown on the user interface 212 in FIG. 7C illustrate yet more examples. Specifically, the media within tray #1 is represented using a transparent icon indicating that transparencies are within tray #1. The media within tray #2 includes a tab and, therefore, the icon shown also includes a tab, for otherwise standard white 8½×14 media. Tray #3 includes A4 size paper that has one side that is a custom dark red color, while the other side is a standard white color (and such was detected using a document handler that has the ability to scan both sides of the sheet of media); and, therefore, the user interface 212 in FIG. 7C uses an icon showing two overlapping pages, one of which is dark red, and the other of which is standard white, to illustrate the different colors on the front and back of each sheet of print media within tray #3. Tray #4 includes standard white 8½×14 media that has five different tab locations (and such was detected by the user loading five differently tabbed sheets into the document handler that the systems and methods herein automatically counted while determining each unique tab location for each separate page); and, therefore, the user interface 212 in FIG. 7C uses a standard white icon showing five overlapping pages, each with a different tab location.

Also, when the processor 224 prepares a print job for printing with the printer 204, the processor 224 incorporates the color of the sheet 252 of print media within calculations of colors to utilize during the printing. Therefore, rather than incorporating a standard, generic print media color within such print job processing, the methods and devices herein utilize the actual scanned color of the electronic image produced in item 110 in such print job preparation. Thus, when the colors of each bit within the bitmap are selected during rasterization, the processor 224 herein incorporates the actual color of the sheet of print media within such calculations of printing colors.

Figure 8:
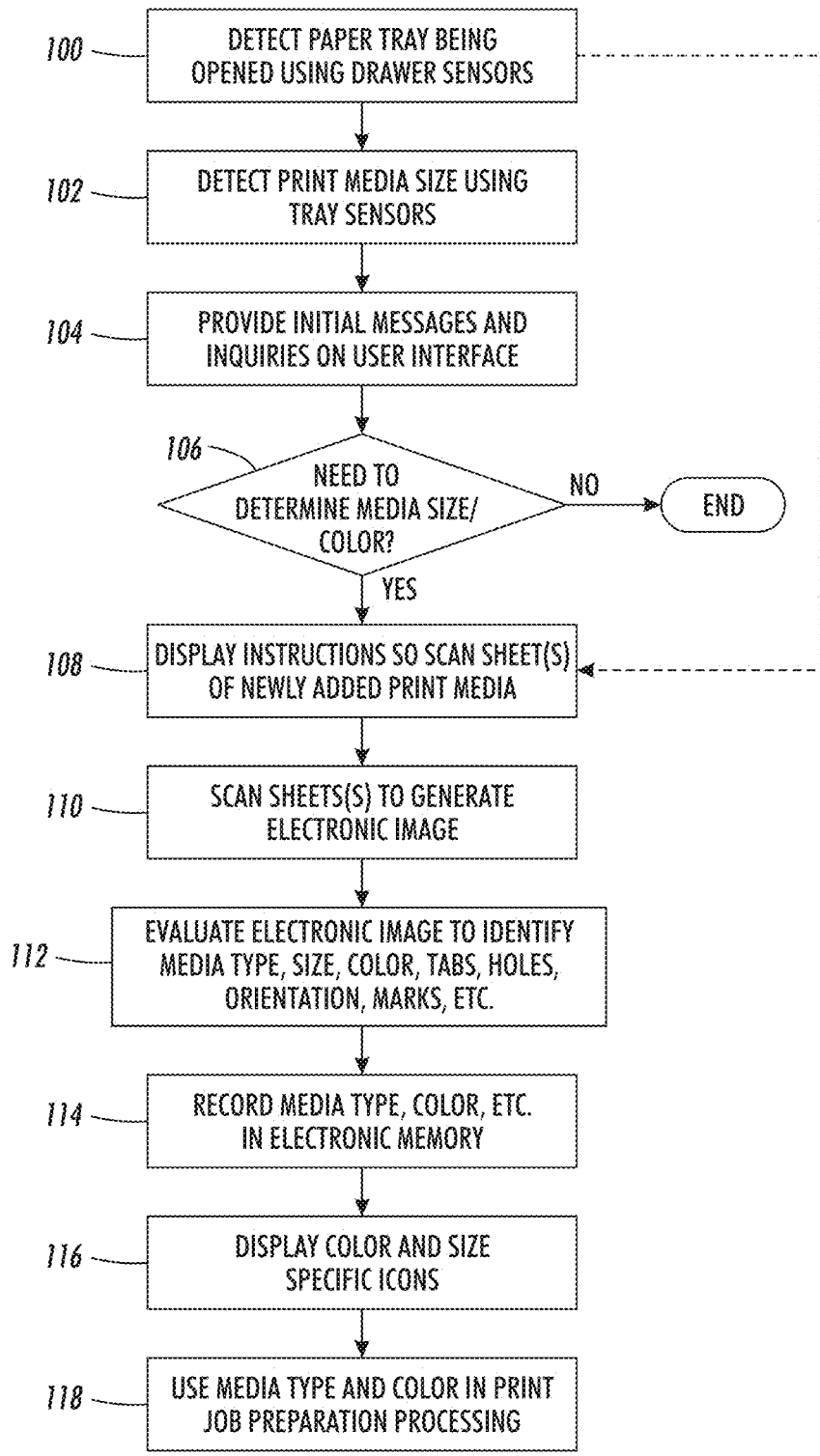
FIGS. 8 and 9 are flow diagrams of various methods herein.

FIG. 8 is a flowchart illustrating various methods herein. In item 100, these methods detect the opening of a print media storage device by the drawer sensor of the printer, which indicates that print media could have been added to the print media storage device. As would be understood by those ordinarily skilled in the art, the terminology "opening a print media storage device" means any action that a sensor can detect of a user adding print media. For example, such actions can include a user placing print media in a manual feed tray, a user lowering an elevator in order to add print media to a platform, a user opening the door that accesses locations where print media can be added, etc. Therefore, item 100 and FIG. 8 is intended to include all such activities, and all similar activities.

As shown in item 102, these methods initially attempt to determine the size of the print media added to the print media storage device using the tray sensors. This is one way these methods determine whether the media (in the print media storage device that was opened in item 100) has changed. Specifically, if the tray sensors detect that the media added to the print media storage device is the same size as the print media that was previously in the print media storage device (maintained in computer memory), these methods can optionally not provide any messages to the user through the user interface (and this may only occur for standard sized sheets, because the tray sensors may only detect standard sheet sizes). Again, the tray sensors 262 may not be able to determine the size of custom sized print media within the paper tray 230, because the tray sensors 262 may not be able to detect edges or sides of the print media of custom sized print media, or may not be able to detect a sufficient number of edges or sides of custom sized print media.

Therefore, if the tray sensors detect that the media added to the print media storage device is the same size as the print media that was previously in the print media storage device, the messages described in item 104 can be omitted. However, as shown in item 104, these methods can optionally always provide some initial messages and inquiries to the user any time a print media storage device is detected as being opened in item 100, irrespective of whether the tray sensors detect that the size of the print media has not changed.

With regard to the type of messages and inquiries that can be provided in item 104, some examples are shown in FIGS. 3 and 4, where the user is asked whether a different size, color, or type of print media has been added to the print media storage device (FIG. 3) and whether the newly added print media is a standard size, color, and type (FIG. 4). Another exemplary message/inquiry is shown in FIG. 5, where the user interface can ask the user to confirm the print media size that the tray sensors detected (and a presumed standard color and type). In the example shown in FIG. 5, the sensors detected A4 size print media, and these examples presume a standard white copy paper color for such print media.

In item 106, if the user indicates that a different size or color print media has been added (e.g., FIG. 3), if the tray sensors detect that a different size media has been added, or if the tray sensors cannot determine the size print media size, processing proceeds to item 108 (otherwise, processing ends). In some implementations, items 102, 104, and 106 can be omitted; and processing can proceed directly from item 100 to item 108 (shown using dashed line in the drawings), such that every time the paper tray is detected as being opened (100), instructions to scan sheet of newly added print media are displayed on the user interface (108) without any intermediate processing.

As shown in item 108, these methods display, on the user interface of the printer (e.g., FIG. 6) instructions to use the document scanner of the printer to scan a sheet of print media (of the stack of print media that is being added to the print media storage device) in ultimate response to the processing started by the drawer sensor detecting the opening of the print media storage device in item 100.

As shown in FIG. 6, the instructions provided in item 108 can also direct the sheet of print media be oriented the same as the stack of print media is oriented in the print media storage device. As also shown in FIG. 6, if tabbed sheets are being added, these methods can also display additional instructions to use the document scanner to scan multiple tabbed sheets of print media.

Item 110 illustrates that these methods generate (using the document scanner) an electronic image of the sheet(s) of print media, from the scanning of the sheet of print media. The scanning process performed in item 110 can be performed using a document handler that has the ability to scan both sides of a sheet. Therefore, some implementations use duplex scanning to determine if the front and back of the sheet are the same or different (e.g., are the same color, have the same markings, logos, etc.).

In item 112, such methods then evaluate (using the processor of the printer) the electronic image of the sheet of print media to identify the media type, size, color, tabs, holes, orientation, marks, etc., of the stack of print media being added to the print media storage device. Thus, for example, when evaluating the electronic image in item 112, the processor can evaluate the transparency and reflection characteristics of the sheet in the electronic image to estimate the media type (e.g., copy paper, bond paper, transparencies, cardstock, etc.) of the sheet of media. Also, item 112 identifies locations and orientations of holes in the sheet of print media, pre-printed marks on the sheet of print media, as well as locations of tabs within the stack of print media. Such pre-printed marks include letterheads, logos, watermarks, etc. The evaluation in item 112 includes image deskew processes, edge detection of a sheet rotated or displaced on platen, etc., to accurately determine the size and shape of the media.

Additionally, in item 114, these methods record, in the electronic memory of the printer, that the print media storage device contains a stack of print media having a specific media type, color, orientation, physical features, etc., as well as the locations and orientations of the holes and pre-printed marks of the stack of print media in the print media storage device. This allows the methods herein to display color and size specific icons, as shown in item 116.

Again, when displaying color and size specific icons (item 116) as shown in FIG. 7A, the graphic icons presented on the user interface 212 have different colors, sizes, etc., depending upon the print media within the different trays. Thus, for example, in FIG. 7A, tray #1 includes white A4 paper, tray #2 includes standard blue 8½×14 paper, etc. However, tray #3 in FIG. 7A includes a custom color A4 size paper that is a mixture of red and orange. Rather than simply displaying a standard red or orange icon, the methods herein display the actual color of the print media that is within tray #3 based on the electronic image produced in item 110 (as closely as the user interface 212 can display such a color).

Therefore, as limited by the display capabilities of the user interface 212, the actual scanned color of the electronic image produced in item 110 is used as the body color for the icons representing the print media within the different trays, and these actual scanned colors are different than the standard blue, green, red, orange, etc., that the user interface would display if the choice of icon color were based merely upon a manually entered, user color identification (or a semi-automated color identification based upon user entry of coded information (barcode, etc.) from print media packaging). In other words, rather than merely displaying icons having standard generic colors, the icons displayed by the methods and devices herein utilized the actual colors from a high resolution scan of the sheet of media (electronic image produced in item 110) and, therefore, present the colors within the print media storage device to the user more accurately than standard generic colors do. In some situations, the icons can be thumbnails of the electronic image produced in item 110, and in others the icons are colored cartoon representations of the sheets of media.

Subsequently, these methods prepare a print job for printing in item 118. Again, rather than incorporating a standard, generic print media color within such print job processing, the methods and devices herein utilize the actual scanned color of the electronic image produced in item 110 in such print job preparation. Thus, when the colors of each bit within a bitmap selected during rasterization, the methods and devices herein incorporate the actual color of the sheet of print media within such calculations of printing colors (using the processor).

Figure 9:
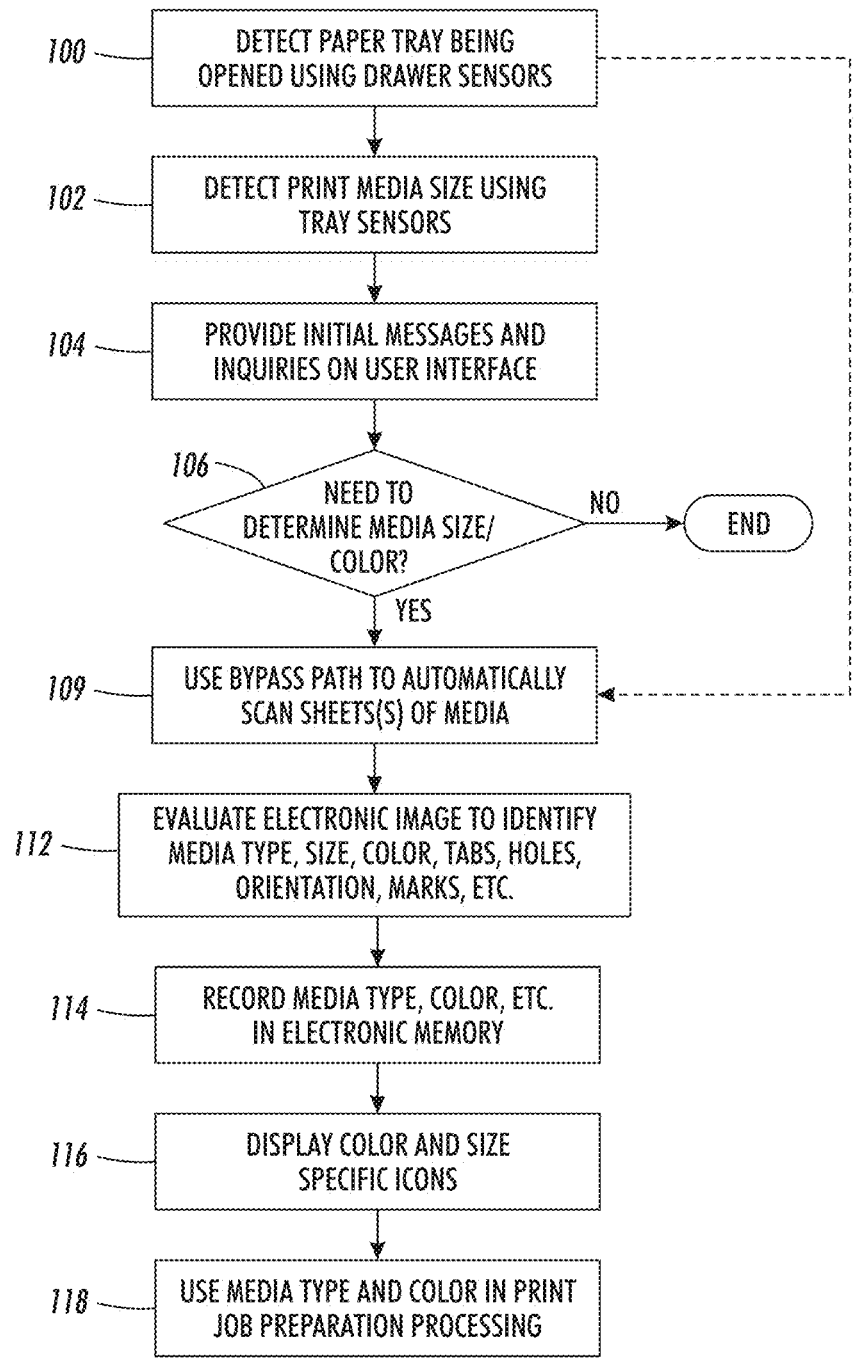

FIG. 9 is a flowchart that relates to utilization of the bypass path, and is the same as the flowchart shown in FIG. 8; except that items 108 and 110 are eliminated, and item 109 is used in their place. More specifically, the flowchart in FIG. 9 shows the automatic utilization of the bypass path. Therefore, rather than displaying instructions for the user to place sheets in the scanner (item 108, FIG. 8) and the process of the user scanning the sheets (item 110, FIG. 8); in FIG. 9, if these methods determine that a sheet should be scanned (item 106), no additional user activity or messages are used; and, instead, the bypass path automatically feeds one of the sheets to the scanner, the scanner automatically scans the sheet, and the bypass path returns the sheet to the paper tray (or simply outputs the sheet to the exit tray of the scanner). All other processes shown in FIG. 9 are the same as those shown in FIG. 8, and a redundant discussion of the same is avoided.

Figure 10:
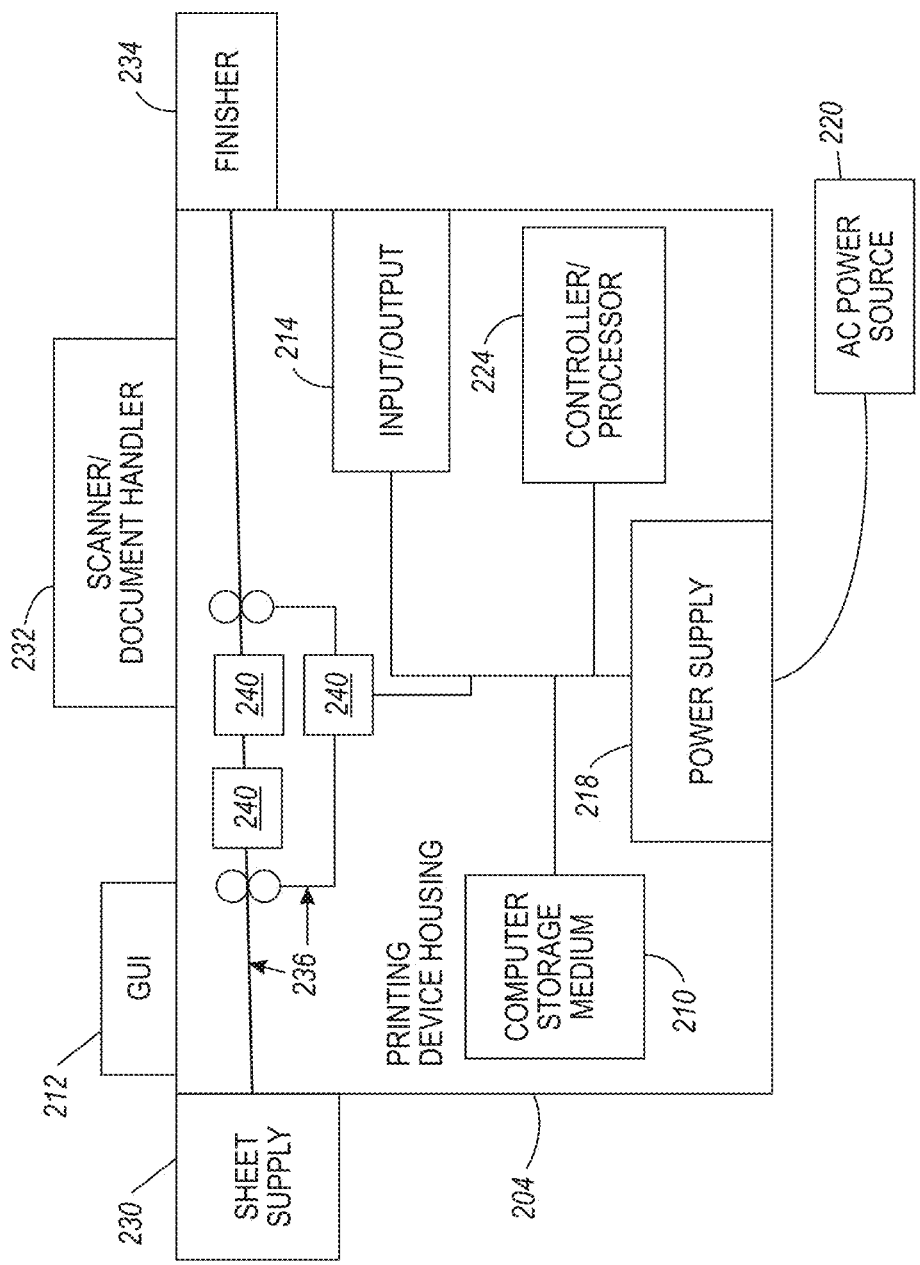
FIG. 10 is a schematic diagram illustrating printing devices herein.

FIG. 10 illustrates many components of printer structures 204 herein that can comprise, for example, a printer, copier, multi-function machine, multi-function device (MFD), etc. The printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the printing device 204 and comprises a wired device or wireless device (of any form, whether currently known or developed in the future). The tangible processor 224 controls the various actions of the printing device 204.

A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 10, a body housing has one or more functional components that operate on power supplied from an alternating current (AC) source 220 by the power supply 218. The power supply 218 can comprise a common power conversion unit, power storage element (e.g., a battery, etc), etc.

The printing device 204 includes at least one marking device (printing engine(s)) 240 that use marking material, and are operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies marking material (toner, inks, plastics, organic material, etc.) to continuous media, sheets of media, fixed platforms, etc., in two- or three-dimensional printing processes, whether currently known or developed in the future. The printing engines 240 can include, for example, devices that use electrostatic toner printers, inkjet printheads, contact printheads, three-dimensional printers, etc. The one or more printing engines 240 can include, for example, devices that use a photoreceptor belt or an intermediate transfer belt or devices that print directly to print media (e.g., inkjet printers, ribbon-based contact printers, etc.).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, book-making machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Thus, a scanner or image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the art, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printer comprising:
   a print media storage device;

a drawer sensor positioned to detect opening of said print media storage device;

a processor electrically connected to said drawer sensor;

a document scanner electrically connected to said processor;

tray sensors electrically connected to said processor; and a user interface electrically connected to said processor, said user interface displays instructions to use said document scanner for scanning a sheet of print media of a stack of print media being added to said print media storage device, in response to said drawer sensor detecting said opening of said print media storage device, said processor determines whether said tray sensors detect a media type of said stack of print media, said instructions are displayed on said user interface only if said tray sensors cannot detect said media type of said stack of print media, said document scanner generates an electronic image of said sheet of print media from said scanning of said sheet of print media, said processor evaluates said electronic image of said sheet of print media to identify said media type and a color of said stack of print media being added to said print media storage device, and said processor records that said print media storage device contains said stack of print media having said media type and said color.

2. The printer according to claim 1, said processor evaluates said electronic image to identify locations and orientations of at least one of:

holes in said sheet of print media; and pre-printed marks on said sheet of print media, said pre-printed marks include letterheads, logos, and watermarks, and said processor records said locations and orientations of said holes and said pre-printed marks of said stack of print media in said print media storage device.

3. The printer according to claim 1, said processor prepares a print job for printing with said printer by incorporating said color of said sheet of print media within calculations of colors to utilize during said printing.

4. The printer according to claim 1, said user interface displays additional instructions to use said document scanner to scan multiple tabbed sheets of print media, and said processor evaluates said electronic image to identify locations of tabs within said stack of print media.

5. The printer according to claim 1, said instructions direct that said sheet of print media be oriented the same as said stack of print media is oriented in said print media storage device, and said processor evaluates said electronic image to identify an orientation of said stack of print media in said print media storage device.

6. A printer comprising:

a print media storage device;

a drawer sensor positioned to detect opening of said print media storage device;

a processor electrically connected to said drawer sensor;

a document scanner electrically connected to said processor;

a bypass path, said bypass path comprises sheet feeders that automatically move said sheet of print media from said print media storage device to said document scanner; and a user interface electrically connected to said processor, said user interface displays instructions to use said document scanner for scanning a sheet of print media of a stack of print media being added to said print media storage device, in response to said drawer sensor detecting said opening of said print media storage device, said user interface displays additional instructions to activate said bypass path to automatically use said document scanner for said scanning, said document scanner generates an electronic image of said sheet of print media from said scanning of said sheet of print media, said processor evaluates said electronic image of said sheet of print media to identify a media type and color of said stack of print media being added to said print media storage device, and said processor records that said print media storage device contains said stack of print media having said media type and color.

7. A printer comprising:

a print media storage device;

a drawer sensor positioned to detect opening of said print media storage device;

a processor electrically connected to said drawer sensor;

an electronic memory electrically connected to said processor;

a document scanner electrically connected to said processor;

tray sensors electrically connected to said processor; and a user interface electrically connected to said processor, said user interface displays instructions to use said document scanner for scanning a sheet of print media of a stack of print media being added to said print media storage device, in response to said drawer sensor detecting said opening of said print media storage device, said processor determines whether said tray sensors detect a media type of said stack of print media, said instructions are displayed on said user interface only if said tray sensors cannot detect said media type of said stack of print media, said document scanner generates an electronic image of said sheet of print media from said scanning of said sheet of print media, said processor evaluates said electronic image of said sheet of print media to identify said media type and a color of said stack of print media being added to said print media storage device by evaluating a size, color characteristic, transparency, and reflection characteristic of said electronic image of said sheet of print media, and said electronic memory records that said print media storage device contains said stack of print media having said media type and said color.

8. The printer according to claim 7, said processor evaluates said electronic image to identify locations and orientations of at least one of:

holes in said sheet of print media; and pre-printed marks on said sheet of print media, said pre-printed marks include letterheads, logos, and watermarks, and said electronic memory records said locations and orientations of said holes and said pre-printed marks of said stack of print media in said print media storage device.

9. The printer according to claim 7, said processor prepares a print job for printing with said printer by incorporating said color of said sheet of print media within calculations of colors to utilize during said printing.

10. The printer according to claim 7, said user interface displays additional instructions to use said document scanner to scan multiple tabbed sheets of print media, and
said processor evaluates said electronic image to identify locations of tabs within said stack of print media.

11. The printer according to claim 7, said instructions direct that said sheet of print media be oriented the same as said stack of print media is oriented in said print media storage device, and
said processor evaluates said electronic image to identify an orientation of said stack of print media in said print media storage device.

12. A printer comprising:
a print media storage device;
a drawer sensor positioned to detect opening of said print media storage device;
a processor electrically connected to said drawer sensor;
an electronic memory electrically connected to said processor;
a document scanner electrically connected to said processor;
a bypass path, said bypass path comprises sheet feeders that automatically move said sheet of print media from said print media storage device to said document scanner; and
a user interface electrically connected to said processor,
said user interface displays instructions to use said document scanner for scanning a sheet of print media of a stack of print media being added to said print media storage device, in response to said drawer sensor detecting said opening of said print media storage device,
said user interface displays additional instructions to activate said bypass path to automatically use said document scanner for said scanning,
said document scanner generates an electronic image of said sheet of print media from said scanning of said sheet of print media,
said processor evaluates said electronic image of said sheet of print media to identify a media type and color of said stack of print media being added to said print media storage device by evaluating a size, color characteristic, transparency, and reflection characteristic of said electronic image of said sheet of print media, and
said electronic memory records that said print media storage device contains said stack of print media having said media type and color.

13. A method comprising:
detecting opening of a print media storage device by a drawer sensor of a printer;
displaying, on a user interface of said printer, instructions to use a document scanner of said printer for scanning a sheet of print media of a stack of print media being added to said print media storage device, in response to said drawer sensor detecting said opening of said print media storage device;
determining whether a media type of said stack of print media is detected by tray sensors of said printer;
displaying said instructions on said user interface only if said tray sensors cannot detect said media type of said stack of print media;

generating, by said document scanner, an electronic image of said sheet of print media, from said scanning of said sheet of print media;
evaluating, by a processor of said printer, said electronic image of said sheet of print media to identify said media type and a color of said stack of print media being added to said print media storage device; and
recording, in an electronic memory of said printer, that said print media storage device contains said stack of print media having said media type and said color.

14. The method according to claim 13, said evaluating of said electronic image identifies locations and orientations of at least one of:
holes in said sheet of print media; and
pre-printed marks on said sheet of print media,
said pre-printed marks including letterheads, logos, and watermarks, and
said recording in said electronic memory records said locations and orientations of said holes and said pre-printed marks of said stack of print media in said print media storage device.

15. The method according to claim 13, said method further comprising preparing a print job for printing with said printer by incorporating said color of said sheet of print media within calculations of colors to utilize during said printing, using said processor.

16. The method according to claim 13, said displaying further comprises displaying additional instructions to use said document scanner to scan multiple tabbed sheets of print media, and
said evaluating of said electronic image identifies locations of tabs within said stack of print media.

17. The method according to claim 13, said displaying of said instructions displays instructions that direct said sheet of print media be oriented the same as said stack of print media is oriented in said print media storage device, and
said evaluating of said electronic image identifies an orientation of said stack of print media in said print media storage device.

18. A method comprising:
detecting opening of a print media storage device by a drawer sensor of a printer;
displaying, on a user interface of said printer, instructions to use a document scanner of said printer for scanning a sheet of print media of a stack of print media being added to said print media storage device, in response to said drawer sensor detecting said opening of said print media storage device;
displaying, on a user interface, additional instructions to activate a bypass path of said printer to automatically use said document scanner for said scanning;
generating, by said document scanner, an electronic image of said sheet of print media, from said scanning of said sheet of print media;
evaluating, by a processor of said printer, said electronic image of said sheet of print media to identify a media type and color of said stack of print media being added to said print media storage device; and
recording, in an electronic memory of said printer, that said print media storage device contains said stack of print media having said media type and color.

* * * * *